March 8, 1949.  C. C. LAURITSEN  2,464,181
ROCKET DEVICE
Filed April 2, 1943  2 Sheets-Sheet 1
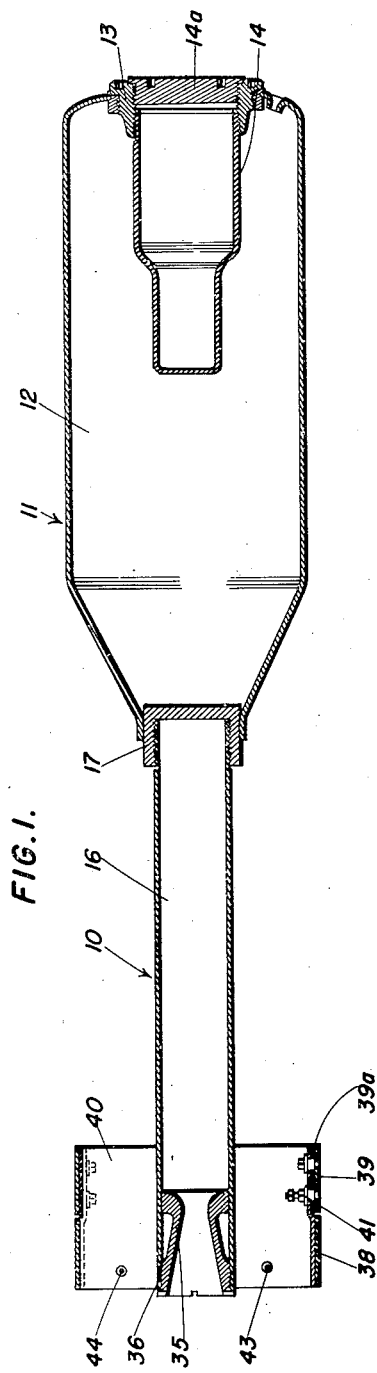
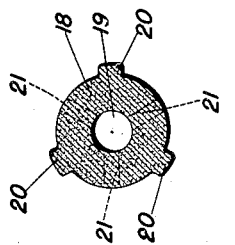
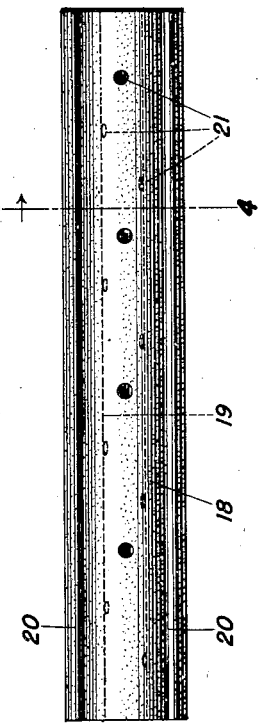
INVENTOR
CHARLES C. LAURITSEN
BY
ATTORNEY

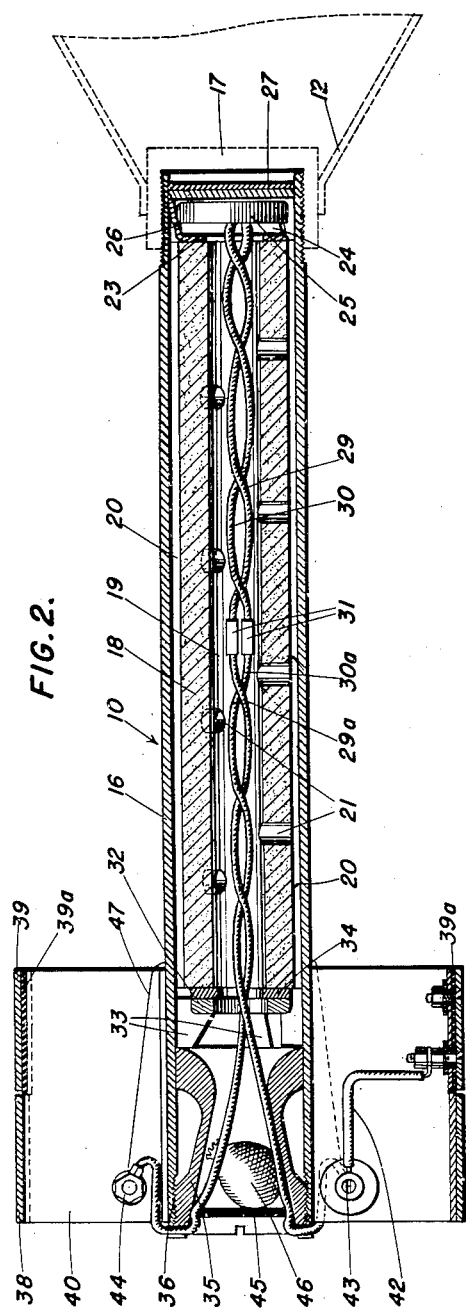

Patented Mar. 8, 1949

2,464,181

UNITED STATES PATENT OFFICE 2,464,181

ROCKET DEVICE

Charles C. Lauritsen, Pasadena, Calif., assignor to the United States of America as represented by the Secretary of the Navy Application April 2, 1943, Serial No. 481,644

1 Claim. (Cl. 102—49)

This invention relates to jet propulsion rockets and more particularly to a novel rocket motor having a solid grain of combustible propellant supported in a motor body to drive the motor by simultaneous combustion of internal and external surfaces of the grain. The new motor is simple and compact in construction, provides an accurate flight, and affords improved combustion over prior motors of this type. Accordingly, the invention may be used to particular advantage for projecting bombs, flares, and the like, in weapons requiring a high degree of accuracy and facility in handling, although it is to be understood that the invention may be used for other purposes as well.

One of the difficulties encountered heretofore in jet propulsion rockets is to obtain proper combustion of the propellant charge at the desired rate. Rocket motors as commonly made have a propellant charge in either one of two general forms. In one form, a solid charge of propellant is employed which completely fills the combustion chamber, as disclosed in a patent to L. A. Skinner, No. 2,206,057, while in another form the charge is compressed into a grain which fits closely against the wall of the combustion chamber and has a central longitudinal passage or core, as disclosed in a patent to Stoifa et al., No. 1,901,852. The burning characteristics of these propellants are not entirely satisfactory for various reasons, among which are their non-uniformity of combustion resulting in widely differing flight trajectories for identical rockets, the development of excessive pressures, abrupt changes in pressure, and the fact that a substantial part of the propulsion power is generated after the rocket leaves the guide or projector, due to progressive burning of the charge, whereby the flight is inaccurate.

One object of the present invention, therefore, resides in the provision of a novel rocket motor which overcomes the above-mentioned difficulties in prior motors of this type and in which the combustion of the propellant charge is controlled so that accurate flight of the rocket through a uniform trajectory may be had. A rocket made in accordance with my invention comprises a cylindrical motor body containing a single grain of propellant, such as ballistite, and having a nozzle in its rear end portion through which the products of combustion of the propellant are discharged. The propellant grain is generally cylindrical in form and has an initial internal combustion surface of substantial area defining an axial passage. The initial combustion, however, is not confined to the internal surface in the passage, and to this end I mount the propellant grain with its external cylindrical surface in spaced relation to the wall of the motor body, whereby the external surface is free to burn simultaneously with the internal surface. Preferably, the grain is provided with a series of radial openings arranged in a helix along its length, as I have found that by the use of such openings the burning characteristics of the grain may be considerably improved and the internal and external pressures on the grain tend to equalize so as to reduce the mechanical strain thereon.

Another object of the invention is to provide a rocket motor having novel means for supporting the propellant grain securely in position to obtain combustion simultaneously on its internal and external surfaces. In accordance with my invention, the grain is provided with longitudinal ribs on its outer cylindrical surface, and the ribs engage the inner wall of the motor body so as to support the grain along its length with a substantial clearance between the motor body and the cylindrical surface of the grain. With this construction, the outer surface of the grain burns simultaneously with the inner surface defining the axial passage, and as the inner surface increases in area due to burning, the outer surface decreases in area so that the total burning surface remains substantially constant. Accordingly, the usual sudden changes in pressure during combustion are reduced, the propellant power is generated more smoothly, and the combustion is accelerated, without excessive pressures, so that substantially all of the power is expended while the rocket is still in the projector, resulting in greater flight accuracy.

These and other objects of the invention may be better understood by reference to the accompanying drawings, in which Fig. 1 is a longitudinal sectional view of a rocket-propelled device embodying one form of the new motor, with the parts in the motor body removed;

Fig. 2 is an enlarged longitudinal sectional view of the motor shown in Fig. 1;

Fig. 3 is a detail view of the powder grain for the motor;

Fig. 4 is a sectional view on the line 4—4 in Fig. 3;

Fig. 5 is an end view of the saddle for supporting one end of the grain;

Fig. 6 is a sectional view on the line 6—6 in Fig. 5, and

Fig. 7 is an end view of the grid for supporting the opposite end of the powder grain.

Referring to the drawings, the motor 10 is shown connected to a pay load 11 in the form of an antisubmarine bomb comprising a casing 12 for receiving a high explosive charge (not shown). The nose portion of the bomb casing is substantially flat to cause the assembly to assume a substantially vertical position when it strikes the water, and in the central portion of the nose is an annular rim 13 in which a liner 14 is threaded. The liner projects into the casing 12 and is adapted to receive a suitable fuze (not shown), such as a hydrostatically-armed, impact-fired fuze, for detonating the main charge in the casing. A plug 14a is threaded in the open end of the liner and may be removed when the fuze is to be inserted.

The motor 10 comprises a cylindrical body 16, which may be made of seamless steel tubing, connected at its front end to the bomb casing 12 by means of a generally cup-shaped adapter 17. The adapter is welded in a recess in the rear end of the bomb casing, and the motor body 16 is threaded in the open end of the adapter. Within the motor body is a propellant charge in the form of a cylindrical powder grain 18, such as ballistite, the grain having an axial passage 19 extending through it and also having spaced longitudinal ribs 20 on its outer cylindrical surface.

The powder grain fits closely in the motor body on the ribs 20 which serve to space the outer cylindrical surface of the grain from the inner wall of the motor body to provide external combustion surfaces between the ribs. Preferably, the grain has a series of radial openings 21 arranged in a helix along its length, each opening being spaced from the adjacent opening a distance equal substantially to twice the diameter of the axial passage 19, and each opening having a diameter equal to substantially one-half the web thickness of the grain, that is, to substantially one-half the difference between the internal and external diameters of the grain. The longitudinal ribs 20 may be in the form of strips of combustible material, such as Celluloid, cemented to the grain or they may be integral with the grain. Contact between the ribs 20 and the motor body may be prevented by a lacquer coating on the inner wall of the body.

At its front end, the grain 18 is supported in the motor body by a saddle 23 cemented to the end of the grain and having a central opening aligned with the passage 19. The saddle is preferably made of Celluloid or other combustible material and is provided on its edge portion with spaced tabs 24 extending forwardly from the grain. An electrically operable igniter 25 near the front end of the motor body is spaced from the face of saddle 23, the igniter fitting closely against the tabs 24 and being held in spaced relation to the face of the saddle by shoulders 26 on the tabs. Thus, the igniter is supported on the tabs 24, and the latter are clamped between the igniter and the inner wall of the motor body. A fiber closure disc 27 is mounted in the motor body directly in front of the igniter and adjacent the closed end of the adapter 17, the disc being preferably sealed along its edges by a suitable sealing compound. The igniter is adapted to be energized through leads 29 and 30 extending through the saddle into the grain passage 19, where the leads are connected to wires 29a and 30a by joints 31.

The rear end of the powder grain 18 is supported by a grid comprising a ring 32 having radial legs 33 which engage the inner wall of the motor body so as to support the ring with its opening in concentric relation to the motor body. The grid ring is connected to the adjacent end of the powder grain by a Celluloid washer 34 cemented on its opposite faces to the ring and the grain, respectively. At their rear ends, the legs 33 abut against a nozzle 35 screwed into a threaded course 36 in the motor body.

On the rear end of the motor body is a tail assembly which forms part of the ignition system for the powder grain, as disclosed in my copending application, Ser. No. 481,645, filed April 2, 1943. More particularly, the tail assembly comprises a pair of metal rings 38 and 39 extending around the body and disposed end to end in closely spaced relation. The rings are concentric with the motor body and are supported thereon by radial fins 40 which may be connected at their inner ends to the side wall of the motor body, and at their outer ends to the inner surfaces of the rings 38 and 39.

The forward ring 39 is insulated from the fins 40 by suitable insulation 39a and has a terminal 41 which is likewise insulated from the fins. The ring 39 is electrically connected through the terminal 41 and an insulated conductor 42 to a second insulated terminal 43 on one of the fins 40. The fin diametrically opposite the terminal 43 has a terminal 44 connected to the wire 29a which extends through the grid 32 and the nozzle. Similarly, the wire 30a extends through the grid and the nozzle and is connected to the insulated terminal 43. Preferably, the interior of the motor body 16 is sealed by a fiber disc 45 in the nozzle, and a container of desiccant material 46 is mounted in the nozzle to absorb any moisture in the motor body.

As disclosed in my above-identified copending application, the rocket assembly is adapted to be mounted in a trough-shaped projector or guide having a pair of knife-blade contacts engaging the rings 38 and 39, respectively, whereby the igniter 25 may be energized through the projector contacts, the rings 38 and 39 and the wires 29 and 30.

When the igniter 25 is fired, the resulting blast is communicated through the space between the igniter and the adjacent end of the powder grain into the axial passage 19 and the external combustion spaces between the ribs 20. Accordingly, the powder grain burns simultaneously on its internal and external surfaces, and as the internal surface defining the passage 19 increases due to combustion, the external surface decreases so that the total combustion surface remains substantially constant, whereby the usual abrupt changes in pressure are avoided. I have found that the radial openings 21 in the grain tend to improve its combustion characteristics, providing more uniform burning and more constant pressure. Also, the openings 21 tend to equalize the pressures in passage 19 and the space around the outside of the grain, so as to reduce the mechanical strain on the grain. It will be apparent that the products of combustion of the powder grain are discharged under pressure through the grid 32 and the nozzle. By making the saddle 23 and the washer 34 of a combustible material, these members burn and provide additional pressure in the motor body upon ignition of the powder grain.

I claim:

A rocket motor comprising a hollow body of generally cylindrical form, a generally cylindrical grain of propellant charge in the body having an axial passage and radial openings spaced along its length, longitudinal ribs on the grain for supporting it in the body to provide between the grain and the cylindrical wall of said body a substantial clearance communicating with the passage through the radial openings, a grid in the body at the rear end of the grain and having an axial opening aligned with said passage, a combustible washer connecting the grain to the grid, the cylindrical outer wall of the grain and the walls of said passage and radial openings forming initial combustion surfaces, an igniter in the body at the front end of the grain for igniting the grain whereby said surfaces burn simultaneously, a combustible saddle connected to the front end of the grain and having a part disposed between the igniter and a wall of said body, and a nozzle in the rear end of the body aligned with said grid opening and through which the products of combustion of the propellant are discharged.

CHARLES C. LAURITSEN.

REFERENCES CITED

The following references are of record in the file of this patent:

UNITED STATES PATENTS

| Number    | Name      | Date           |
|-----------|-----------|----------------|
| 677,528   | Maxim     | July 2, 1901   |
| 726,901   | Gathmann  | May 5, 1903    |
| 989,375   | Luciani   | Apr. 11, 1911  |
| 1,360,602 | Van Deuren| Nov. 30, 1920  |

FOREIGN PATENTS

| Number   | Country | Date          |
|----------|---------|---------------|
| 502,560  | France  | Feb. 24, 1920 |
| 831,496  | France  | Jan. 7, 1938  |